United States Patent [19]

Nomura et al.

[11] 4,377,413

[45] Mar. 22, 1983

[54] REFRACTORY COMPOSITION FOR FLOW CASTING

[75] Inventors: Mitsuo Nomura, Kimitsu; Shigeru Amano; Sho Okubo, both of Kisarazu; Takuo Hosaka, Toyota; Kunihiko Shiraishi, Toyota; Ryuzi Adachi, Toyota, all of Japan

[73] Assignees: Nippon Steel Corporation; Nippon Crucible Company, Ltd., both of Japan

[21] Appl. No.: 288,300

[22] Filed: Jul. 30, 1981

[30] Foreign Application Priority Data

Aug. 8, 1980 [JP] Japan ................... 55-108926

[51] Int. Cl.$^3$ ............................................ C04B 19/04
[52] U.S. Cl. ......................................... 106/76; 106/84
[58] Field of Search ............................... 106/76, 84, 74

[56] References Cited

U.S. PATENT DOCUMENTS 3,849,356 11/1974 Matsui et al. ..................... 106/76
4,171,984 10/1979 Hosaka et al. .................... 106/84

*Primary Examiner*—James Poer
*Attorney, Agent, or Firm*—Robert E. Burns; Emmanuel J. Lobato; Bruce L. Adams

[57] ABSTRACT

A refractory composition for flow casting consists essentially of 100 parts by weight of refractory material, 0.1 to 2 parts by weight of sparingly water-soluble aluminum tripolyphosphate, 0.2 to 3 parts by weight of alkali metal silicate, 0.5 to 5 parts by weight of clay, up to 2/5 part by weight of organic binder per amount of clay, and 0.2 to 4 parts by weight of at least one hardening promoting reagent selected from the group consisting of calcium silicate and calcium aluminate.

1 Claim, No Drawings

REFRACTORY COMPOSITION FOR FLOW CASTING

BACKGROUND OF THE INVENTION

1. Field of Invention

This invention relates to improvements in refractory compositions for flow casting.

Conventional castable refractories which have been generally used for flow casting, contain about 15 parts by weight of alumina cement as a main binder which may reduce heat- and corrosion-resistance of the refractories due to its relatively high CaO contents, and also cause explosion by rapid drying because of liberating water of crystallization when heated.

Some of the present inventors have developed a useful refractory composition for flow casting in which such alumina cement is not used as a main binder. Such composition is disclosed in Japanese patent application No. 52-40699, corresponding to U.S. Pat. No. 4,171,984.

In the composition of this prior invention, a combination of an alkali metal silicate and a sparingly water-soluble aluminum tripolyphosphate are used as a main binder, and a small amount thereof is added to the refractory material. The refractory composition of this prior invention exhibits enough flowability while being cast into the mold because of the slow hardening reaction of the sparingly water-soluble aluminum tripolyphosphate—which exhibits very low solubility in water at room temperature—to the alkali metal silicate, and then hardens after a period of time required for casting has passed.

This refractory composition has been used as a lining material for blast furnace guide troughs, which are, in general, used under such severe service conditions that conventional castable refractories can not be used, and good results have been obtained.

Furthermore, it exhibits better corrosion resistance to molten iron and slags than usual trough lining materials applied by ramming, and has the greater advantage that the life-time of the furnace material is extended remarkably so that consumption of the material per ton of produced iron can be reduced by half.

It also has the advantage in case of being applied to the wall of an ingot heating furnace, that no explosion is observed even by rapid drying, nor any heat spalling is caused while in use, and double life-time is expected when compared to the usual castable refractories.

However, such refractories of the prior invention still have the following defects. In application, refractory material of the prior invention is mixed with water and cast into a mold of desired shape and is kept standing for curing, but because of the slow hardening characteristics of sparingly water-soluble aluminum tripolyphosphate, enough green strength, i.e. shape retention, can not be obtained by such curing at room temperature, so that when the mold is removed, the cast material moves with the mold and as a result, the surface of the material deforms or small cracks occur within the body, and cause constructional defects to reduce the life-time of the furnace.

Therefore, such insufficient green strength may prevent quick removal of the mold after casting when required as for example in connection with the furnace operation, defects appear more often when the mold is removed in less than 10 hours after casting and such defects may increase with the thickness of the work and become remarkable when the thickness exceeds about 300 mm. Therefore, in practice, the work is heated from outside of the mold before removing the same, but this may require troublesome and time wasting operations.

SUMMARY OF THE INVENTION

An object of the present invention is to provide a refractory composition for flow casting which maintains the characteristics of the composition of the prior invention and in which such defects as described above are removed.

The refractory composition of the present invention resides in that a small amount of hardening promoting reagent such as calcium silicate and calcium aluminate which reacts mildly with water and promotes hardening while curing is added to the refractory composition of the prior invention (J. P. Appln. No. 52-40699, U.S. Pat. No. 4,171,984).

The refractory composition of the present invention comprises 100 parts by weight of refractory material, 0.1–2 parts by weight of sparingly water-soluble aluminum tripolyphosphate, 0.2–2 parts by weight of alkali metal silicate, 0.5–5 parts by weight of clay and up to 2/5 part by weight of an organic binder such as carboxymethyl cellulose per amount of clay, and further comprises 0.2–4 parts by weight of at least one member of the group of hardening promoting agents consisting of calcium silicate and calcium aluminate, and the refractory composition can be kneaded by adding water before use and cured after casting.

DETAILED DESCRIPTION OF THE INVENTION

Binding materials such as alkali metal silicate and aluminum tripolyphosphate which are described in the prior invention may be used in the refractory composition of this invention, and sodium silicate, potassium silicate or lithium silicate may be used as an alkali metal silicate.

The hardening promoting reagent should satisfy various requirements in connection with the application of the material as well as with the properties of the applied material. As for examples, it should not only promote the hardening of alkali metal silicate and aluminum tripolyphosphate which is sparingly water-soluble, but also it should react mildly with water and harden itself and increase green strength, without lowering the heat- and corrosion-resistance of refractories thus obtained. It should also have stability as a reagent at room temperature within a range in which a little hygroscopic property may be permissible. Also it should not be hazardous in handling.

The inventors of the present invention have found that water-hardenable calcium silicate and water-hardenable calcium aluminate are most suitable reagents which satisfy the above requirements. These reagents can be commercially available as portland cement and alumina cement, and enable easy performance of the present invention. In this regard, however, use of an excessive amount of the hardening promoting reagent is not recommendable, because remarkable lowering of the heat corrosion-resistivity against molten metal is observed. The addition of an excessive amount thereof also causes rupture of the material in case of rapid drying. This will be seen more clearly with sample No. 8 in Tables 1 and 2 below. Addition of over 4 parts by weight of hardening promoting reagent will worsen the properties of the refractories, and no remarkable effect is observed with the addition of less than 0.2 parts by weight of the same. Therefore, the suitable range of the hardening promoting reagent will be 0.2–4 parts by weight.

The hardening mechanism of the refractory composition of the present invention may be considered to be as follows. The alkali metal silicate forms aqueous sol by adding water, and gel formation takes place slowly by the mild reaction of sparingly water-soluble aluminum tripolyphosphate, and harden while curing, but the hardening is insufficient at room temperature, and the green strength is still low. If there is present a hardening promoting reagent such as calcium silicate or calcium aluminate which reacts mildly with water, this reagent not only forms a hydrated compound and hardens itself, but also it promotes the gel formation of aqueous sol of the alkali metal silicate by the heat produced by the above hydration reaction, and at the same time, it may increase the solubility of aluminum tripolyphosphate by the above heat evolution—appreciable dissolution was observed actually with the temperature rise—, and the dissolved aluminum tripolyphosphate may accelerate the above gel formation of aqueous sol of the alkali metal silicate, and thus increase the strength remarkably within a short curing time.

As the obtained green strength is far greater than the sum of the strength obtainable by the reaction between alkali metal silicate and aluminum tripolyphosphate, at room temperature and the hydration reaction of the hardening promoting reagent, the green strength is supposedly increased by such combined reaction of each component of the binders as explained above.

Also the amount of the binders to be added can be reduced below that used in the previous invention, and the addition of 0.1–2 parts by weight of sparingly water-soluble tripolyphosphate and 0.02–2 parts by weight of alkali metal phosphate per 100 parts by weight of refractory material may be enough.

EXAMPLE

The refractory composition of the present invention was applied to blast furnace trough lining material which is generally used under severe conditions due to being exposed to molten iron and slag and subjected to severe temperature changes, and tests were made in comparison with refractory compositions made in accordance with the prior invention (J. P. A. N. 52-40699, U.S. Pat. No. 4,171,984). Table 1 illustrates the material compositions of this invention with the one in accordance with the prior invention (J. P. A. No. 52-40699) for comparison.

TABLE 1

| | Sample No. | Grain Size | Prior Invention for Comparison | Present Invention 1 | 2 | 3 | 4 | 5 | 6 | 7 | 8 |
|---|---|---|---|---|---|---|---|---|---|---|---|
| Component, parts by weight | White Fused Alumina | 8–4 mm | 25 | 25 | 25 | 25 | 25 | 25 | 25 | 25 | 25 |
| | White Fused Alumina | 4–1 | 35 | 35 | 35 | 35 | 35 | 35 | 35 | 35 | 35 |
| | White Fused Alumina | less than 1 | 10 | 10 | 10 | 10 | 10 | 10 | 10 | 10 | 10 |
| | Silicon Carbide | less than 0.3 | 20 | 20 | 20 | 20 | 20 | 20 | 20 | 20 | 20 |
| | Coal Pitch | less than 0.3 | 5 | 5 | 5 | 5 | 5 | 5 | 5 | 5 | 5 |
| | Metallic Silicon | less than 0.3 | 5 | 5 | 5 | 5 | 5 | 5 | 5 | 5 | 5 |
| | Clay Powder "Kibushi" Clay | | 2 | — | 2 | 2 | 2 | 2 | 1.0 | 2 | 2 |
| | Carboxymethyl Cellulose Powder "Organic Binder" | | — | — | — | — | — | — | 0.1 | — | — |
| | Aluminum Tripolyphosphate Powder | | 1 | — | 0.5 | 0.5 | 0.5 | 0.5 | 0.5 | 1 | 0.5 |
| | Sodium Silicate Powder | | 1 | — | 0.5 | 0.5 | 0.5 | 0.5 | 0.5 | 1 | 0.5 |
| | Portland Cement Powder | | — | 1.5 | 1.5 | — | — | — | 0.5 | — | — |
| | Alumina Cement Powder | | — | — | — | 0.5 | 1 | 3 | 2 | 0.1 | 6 |
| Total Powdery Material, parts by weight | | | 104 | 101.5 | 104.5 | 103.5 | 104 | 106 | 104.6 | 104.1 | 109 |
| Water, parts by weight | | | 8.5 | 9.0 | 8.5 | 8.5 | 8.5 | 9.0 | 9.0 | 8.5 | 10.5 |

Commercially available refractory materials were used except for sparingly water-soluble aluminum tripolyphosphate of which similar material as explained in J. P. A. No. 52-40699 was used. 10 kg of each powdery composition was mixed in an ordinary V-type mixing machine for 10 min., then moved to an ordinary kneading machine with a screw beater and kneaded for 5 min. by adding the required amount of tap water.

The following tests were performed with the kneaded material.

Green Strength (Hardenability):

A part of the kneaded material was cast into an iron mold of 3 mm thickness to form columnar specimens of 50 mm dia. ×50 mm height, and each specimen was cured for 4 hrs, 10 hrs, 16 hrs and 24 hrs respectively in a thermo-hygrostat maintained at 20° C. and 80% humidity. Compressive strength was determined by using a green compression strength testing machine with each cured specimen after removal of the mold.

Durability against Rapid Drying:

A part of the kneaded material was cast into an iron mold of 5 mm thickness to form large columnar specimens of 75 mm dia. ×75 mm height, then cured for 24 hrs in a thermo-hygrostat maintained at the same conditions as above, and after removal of the mold, the specimens were placed into a nichrome wire electric furnace maintained at 400° C., and the durability against rapid drying was checked.

Spalling Resistance:

A part of the kneaded material was formed into specimens and cured by the similar process as mentioned in the prior test, then dried at 110° C. for 24 hrs and heated at 1,450° C. for 2 hrs in a silicon carbide electric furnace (heating rate is 5° C./min.), in a reducing atmosphere, then air cooled to sinter the material. The sintered specimens were then placed in a similar furnace held at 1,200° C., and kept standing for 10 min. and air cooled and held for 30 min. This rapid heating and cooling process was repeated three times and the spalling resistance was checked.

Hot Modulus of Rupture:

A part of the kneaded material was cast into an iron mold to form specimens of 40 mm×40 mm×160 mm size specified in the Japanese Industrial Standard JISR2553, and cured for 24 hrs in the thermo-hygrostat maintained at the same conditions as above, then dried and sintered by the similar processes as mentioned in the above test. Each sintered specimen was placed in a similar furnace as mentioned above which was held at 1,450° C., and kept standing for 1 hr and a hot bending test was performed by the usual testing method.

Corrosion Resistance:

A part of the kneaded material was cast into a mold which almost conforms to the JISR2553, but to form specimens having trapezoidal profile of 20 mm height×36 mm upper side× 53 mm lower side and 120 mm long. The specimens were cured and dried by the same processes as mentioned above. The specimens were then embedded within coke grains and heated to 350° C. in a nichrome wire electric furnace (heating rate is 5° C./min.) and held for 2 hrs and air cooled to accomplish calcination. Eight specimens were then assembled to form octagonal tubing, the tubing was then placed in a graphite crucible, and the gap between the tubing and crucible was filled with alumina powder. The crucible was then mounted on a rotating machine and chips of blast furnace iron and slag were charged thereinto and molten by heating at 1,580° C. and held for 5 hrs by an oxypropane flame while rotating the crucible around a slanted axis, and the corrosion was checked by comparing depth of corrosion at most corroded parts.

The test results are illustrated in Table 2.

words, green strength of more than twice of that of conventional refractory composition can be obtained at about same curing time, so that even when rapid removal of the mold after casting is required, the same will be attained without such troublesome heating process as mentioned above. Furthermore, as the green strength can be increased, defects of the refractories caused by the removal of the mold may be prevented, this may stabilize the furnace construction and extend the life thereof. The refractory composition of this invention may obtain a wider use than that of the prior invention, as the same is made applicable to thick work body. Furthermore, the heat-resistance of the material of the present invention was appreciably improved, and the material also maintains almost the same degree of corrosion-resistance as that of the prior invention and does not rupture even by rapid drying at 400° C., despite the same content of calcium silicate and/or calcium aluminate. These advantages are supposedly obtained by the combined hardening reaction of each component of the binders as described above, and the required green strength of the material is attained by the addition of such small amount of hardening promoting reagent that the other advantageous characteristics of the material are almost not affected by this addition.

While the invention has been described in detail and with reference to specific embodiments thereof, it will be apparent to one skilled in the art that various changes and modifications can be made therein without departing from the spirit and scope thereof.

What is claimed is:

1. A refractory composition for flow casting substantially comprising: 100 parts by weight of refractory material, 0.1-2 parts by weight of sparingly water-soluble aluminum tripolyphosphate, 0.2-2 parts by weight of alkali metal silicate, 0.5-5 parts by weight of clay, up to 2/5 part by weight of organic binder per amount of clay, and 0.2-4 parts of at least one hardening promoting reagent selected from the group consisting of calcium silicate and calcium aluminate.

TABLE 2

| Evaluation | Sample No. | Prior Invention For Comparison | 1 | Present Invention | | | | | | |
|---|---|---|---|---|---|---|---|---|---|---|
| | | | | 2 | 3 | 4 | 5 | 6 | 7 | 8 |
| | Curing Time hrs | | | | | | | | | |
| Green Strength | 4 | 0.8 | Not | 1.1 | 1.0 | 1.5 | 1.9 | 2.3 | 0.8 | 2.8 |
| at 20° C. | 10 | 1.5 | hardened | 3.1 | 3.3 | 3.7 | 4.1 | 4.8 | 1.5 | 5.0 |
| (Compressive | 16 | 1.7 | by | 3.8 | 3.7 | 4.0 | 4.6 | 5.9 | 1.8 | 6.1 |
| Strength kg/cm$^2$) | 24 | 2.0 | curing | 4.4 | 4.3 | 4.8 | 5.2 | 6.6 | 2.2 | 6.8 |
| Rapid Drying Test at 400° C. | | Good | — | Good | Good | Good | Good | Good | Good | Ruptured |
| Spalling Resistance | | Fine Cracks | — | F.C. | F.C. | F.C. | F.C. | F.C. | F.C. | Deep |
| (Three cycles of | | Only | | O. | O. | O. | O. | O. | O. | Cracks |
| heating at 1,200° C. | | | | | | | | | | |
| and air cooling) | | | | | | | | | | |
| Hot modulus of rupture | | 4 | — | 15 | 10 | 16 | 17 | 15 | 13 | 9 |
| at 1,250° C. (Bending | | | | | | | | | | |
| Strength kg/cm$^2$) | | | | | | | | | | |
| Corrosion Resistance | | 100 | — | 102 | 96 | 98 | 100 | 102 | 100 | 140 |
| at 1,580° C.* | | | | | | | | | | |

*Percentage of the depth of corrosion when the corroded depth of refractory of prior invention was taken to be 100.

It will be seen from the above that according to the present invention, green strength of the refractory composition for flowing casting can be increased even within a very short curing time, when compared to conventional refractories. In particular, the strength to permit rapid removal of the mold after casting can be obtained within a curing time less than half of that of conventional refractories (prior invention), in other